B. F. STEWART.
JOURNAL BEARING.
APPLICATION FILED APR. 29, 1912.
1,234,953.
Patented July 31, 1917.
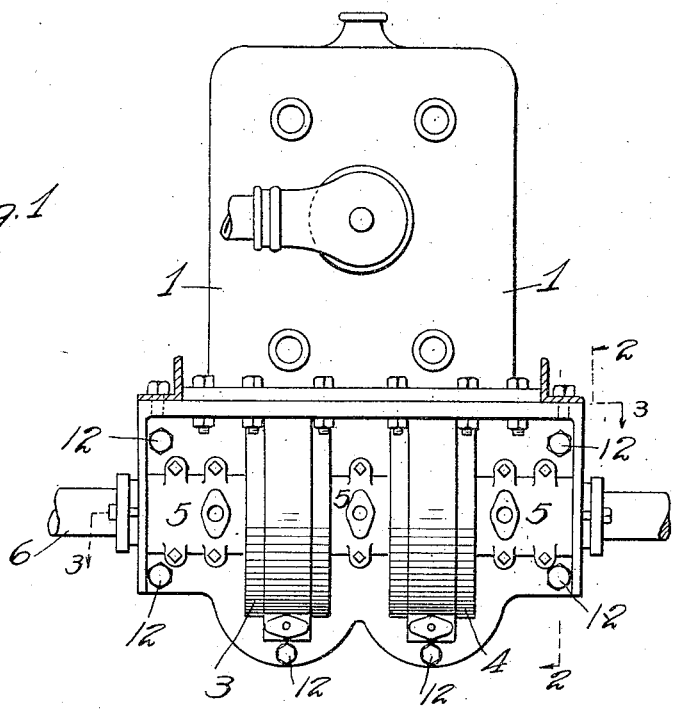
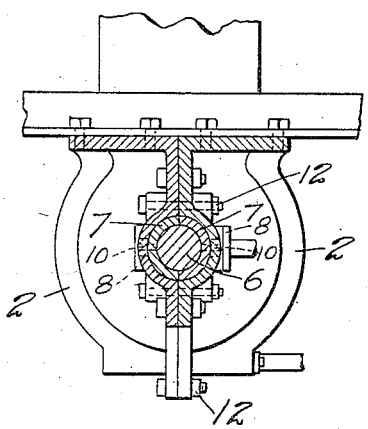
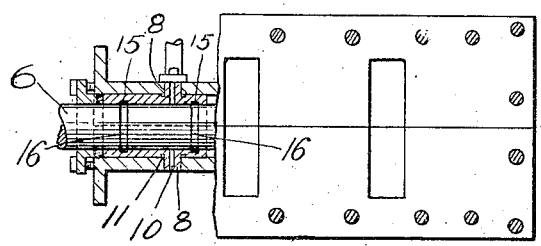
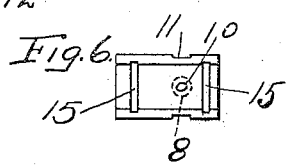
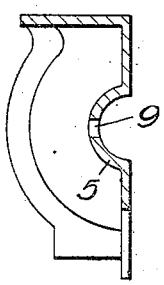
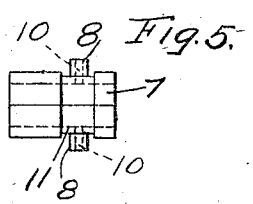
Witnesses:
O. F. Plumtree
Minnie M. Lindeman
Inventor
Benjamin F. Stewart.
by Parker & Carter
his Att'ys

UNITED STATES PATENT OFFICE.

BENJAMIN F. STEWART, OF CHICAGO, ILLINOIS.

JOURNAL-BEARING.

1,234,953.   Specification of Letters Patent.   Patented July 31, 1917.

Application filed April 29, 1912. Serial No. 693,817.

*To all whom it may concern:*

Be it known that I, BENJAMIN F. STEWART, a citizen of the United States, residing at Chicago, in the county of Cook and State of Illinois, have invented certain new and useful Improvements in Journal-Bearings, of which the following is a specification.

This invention relates to improvements in journal bearings and has for its object to provide a new and improved construction of journal boxes for the shaft of the engine, and particularly for the shaft of a two cycle engine where the crank case through which the shaft of the engine runs constitutes the compression chambers for the cylinders of the engine.

My invention is illustrated in the accompanying drawings, wherein

Figure 1 is a side view of the device embodying the invention;

Fig. 2 is a sectional view taken on line 2—2 of Fig. 1;

Fig. 3 is a sectional view taken on line 3—3 of Fig. 1;

Fig. 4 is an end view showing one half of the crank case;

Fig. 5 is a side view of one of the journal boxes.

Fig. 6 is a view showing the inside of one section of the journal boxes.

Like numerals refer to like parts throughout the several figures.

I have illustrated in the drawings a two cycle gas engine with the cylinders 1 mounted upon a crank casing consisting of two parts 2 which are separated on a vertical line. The two parts of the crank case are provided with the compression chambers 3 and 4 and the three journal bearing parts 5 for the crank shaft 6. These journal bearing parts are provided with journal boxes made up of two pieces 7 which have vertical meeting faces. Each of the pieces 7 of the journal boxes has a projection 8 which fits into an opening 9 in the journal bearing part 5. These projections are preferably provided with openings 10 which lead from the outside of the journal to the shaft and through which oil may be admitted. The journal boxes are preferably provided with an annular groove or depression 11 in the plane of the projection 8, the parts being arranged so that there is preferably a groove or depression extending entirely around the journal boxes when in position. The projections are located in this groove and project therefrom as shown. This groove or depression permits the exterior bearing face of the journal boxes to be turned up or finished cheaply and quickly, it being unnecessary to turn down the grooved portion as it does not have any contact with the journal. It will be seen that with this groove, the two ends of the journal boxes may be turned down without any interference by the projections as the finishing tool can be run up to the groove whereupon the entire bearing face will be finished. In the operation of the device, oil gets into this groove or depression and acts as a seal for the compression chambers so as to prevent the air passing into or out of said compression chambers around the journal boxes. The projections may be turned down sufficient to permit the oil to pass around the outside of them so as to prevent the journal boxes being cramped in the journal bearing part because of imperfections or discrepancies due to finishing of the contacting parts. I prefer to first place the two halves of the crank casing together and bolt them in position by the connecting bolts 12 and then bore the openings in the journal bearing part for the shaft and journal boxes, the three openings being made under these conditions thus insuring a proper alinement of the journals and shaft. The two halves of the crank casing are then separated and the parts of the journal boxes placed in position with the projections 8 in the openings 9 and the shaft placed in position and the two halves of the crank casing then bolted together. In a two cycle gas engine of this description, the force is exerted on the journal boxes due to the explosion in the cylinder on the down stroke of the piston and hence the lower bearing face of the journal boxes takes the strain and becomes worn. By means of this construction, the journal boxes when worn can be taken out and turned half way around so as to present a new bearing surface, thus greatly increasing the life of the journal boxes. This can be done because the parts of the journal boxes are interchangeable and can be placed at either side of the journal of the crank casing. The projections 8 prevent the journal boxes from turning and also hold them against end movement. The sections of the journal boxes are also provided with grooves 15 into which fit rings 16 on the crank shaft. The oil gets into the grooves for these rings and acts as a seal on the inside of the journal boxes for the compression chambers thereby preventing the passage of the air through the journal boxes so as to effect the pressure in the compression chambers.

The journal may be connected with any suitable oiling system by means of pipes as shown.

I claim:

1. A journal box comprising a plurality of separable parts, each part provided with a projection integral therewith and projecting from its outer face, the outer face of each of said parts provided with a depression extending thereabout in the plane of said projection, whereby the portion of the outer face of the journal box in the plane of said projection need not be machined in finishing up the journal box.

2. The combination with two separable frame pieces, meeting in a vertical plane, journal bearing parts connected with said pieces at separated points, said journal bearing parts in alinement, journal boxes for said journal bearing parts, each comprising two separable parts, each having a projection thereon, said journal bearing parts provided with openings into which said projections are received, the outer faces of each of said journal boxes provided with a depression extending thereabout in the plane of said projections.

3. The combination with a journal support made up of two journal bearing parts of a journal box comprising two separable pieces, each piece provided with a projection integral therewith, said journal bearing parts provided with openings into which said projections fit.

4. The combination with a journal support made up of two journal bearing parts of a journal box comprising two separable pieces each piece provided with a projection, said journal bearing parts provided with openings into which said projections fit, said journal boxes provided with a depression in the plane of said projections and greater in width than said projections.

5. The combination with a shaft having two separated projecting rings thereon of a journal box made up of separable parts said journal box provided on its inner face with two separated grooves for said rings and with an outer groove intermediate the two grooves on the inner face and two projections in the outer groove, one associated with each part of the journal box, said projections provided with openings and means for connecting said projections with a non-rotating part.

Signed at Chicago, Illinois, this 24th day of April 1912.

BENJAMIN F. STEWART.

Witnesses:
MINNIE M. LINDENAU,
DENIE A. WALTER.

Copies of this patent may be obtained for five cents each, by addressing the "Commissioner of Patents. Washington, D. C."